US005739678A

United States Patent [19]
Nagaraj

[11] Patent Number: 5,739,678
[45] Date of Patent: Apr. 14, 1998

[54] VOLTAGE-TO-CURRENT CONVERTER WITH RAIL-TO-RAIL INPUT RANGE

[75] Inventor: Krishnaswamy Nagaraj, Somerville, N.J.

[73] Assignee: Lucent Technologies Inc., Murray Hill, N.J.

[21] Appl. No.: 769,287

[22] Filed: Dec. 18, 1996

[51] Int. Cl.$^{6}$ .......... G05F 3/16; G05F 3/20; H02M 7/00

[52] U.S. Cl. .......... 323/268; 323/312; 323/315; 363/37

[58] Field of Search .......... 323/315, 312, 323/316; 327/110, 288; 331/17; 363/73

[56] References Cited

U.S. PATENT DOCUMENTS

| | | | |
|---|---|---|---|
| 5,451,859 | 9/1995 | Ryat | 323/312 |
| 5,523,723 | 6/1996 | Arcus et al. | 331/17 |
| 5,619,125 | 4/1997 | Lakshmikumar | 323/315 |

*Primary Examiner*—Peter S. Wong
*Assistant Examiner*—Rajnikant B. Patel

[57] ABSTRACT

A voltage-to-current converter configured to operate over substantially the entire range of a power supply voltage signal that is employed to drive the voltage-to-current converter. A closed-loop voltage-to-current converter is configured to provide a first output current signal substantially linearly responsive to a predetermined range of an input voltage signal having values between the low voltage level of the power supply and a predetermined reference voltage signal. An open loop voltage-to-current converter is coupled to the closed-loop voltage-to-current converter. It is configured to provide a second output current signal, substantially linearly responsive to a predetermined range of input voltage signals, having values ranging between the reference voltage level and the high voltage level of the power supply. The first and second output currents are combined to provide the output current signal of the voltage-to-current converter.

17 Claims, 3 Drawing Sheets

VOLTAGE-TO-CURRENT CONVERTER WITH RAIL-TO-RAIL INPUT RANGE

TECHNICAL FIELD

This invention relates to signal converters, and, more specifically, to a voltage-to-current converter.

BACKGROUND OF THE INVENTION

Voltage-to-current converters are used in many electronic applications. In some of these applications it is desired to generate a current signal in response to an input voltage signal. Conventional voltage-to-current converters may only respond linearly to input voltage signals within a voltage range that is smaller than the entire voltage range generated by a direct current (DC) power supply that drives the voltage-to-current converter. For example, a phase-locked loop may include a voltage-to-current converter that provides a current signal to a current-controlled oscillator in response to a control voltage signal.

FIG. 1 illustrates an exemplary prior art voltage-to-current converter 10, which is employed to generate a current signal $I_{OUT}$ in response to input voltage signals, $V_{IN}$. An operational amplifier 12 is coupled to a current mirror formed by transistors 14 and 16. The voltage signal at the drain terminal of transistor 14 is fed back to the non-inverting terminal of operational amplifier 12. The inverting terminal of amplifier 12 is configured to receive the input voltage signals, $V_{IN}$. The current signal generated through transistor 14 is mirrored in transistor 16. As a result, transistor 16 provides an output current signal, $I_{OUT}$, which is substantially equal to $$[V_O/R_1]=[V_{IN}/R_1]$$

where $V_O$ is the voltage signal at the drain terminal of transistor 14 and R1 is the resistance of resistor 18.

As the value of input voltage signal, $V_{IN}$, increases, the current signal flowing through transistor 14 increases also. However, as the value of input voltage signal, $V_{IN}$, becomes closer to the value of the DC power supply voltage signal, $V_{DD}$, transistor 14 begins to leave its saturation state and enters its triode region, leading to a non-linear voltage/current characteristic. At this point, the voltage signal, $V_O$, ceases to follow voltage signal, $V_{IN}$. Consequently, the output current signal flowing through transistor 16 also stops following the current signal flowing through transistor 14. Thus, the voltage-to-current converter design illustrated in FIG. 1 may not exhibit a linear characteristic for the entire range of input voltage signals.

In certain phase-locked loop applications, it is desirable to use a voltage-to-current converter that has a substantially linear voltage/current characteristic over substantially the entire available power supply voltage signal range, so as to generate a given or predetermined number of phase-shifted clock signals, having substantially the same frequency. A voltage-to-current converter exhibiting such a characteristic is referred to herein as rail-to-rail voltage-to-current converter.

Furthermore, in applications where the amplitude of the operating direct current (DC) voltage supply signal is relatively small, such as three volts, for example, a voltage-to-current converter that exhibits a substantially linear characteristic over substantially the entire range of input voltage signals is even more desirable. This follows, because the available dynamic range of input voltage signal is, at least in part, limited to the amplitude of the voltage supply signal.

With a voltage-to-current converter that has a substantially linear current/voltage characteristic, the phase-locked loop may remain in a stable condition in response to phase-locked open-loop input signals having a wide range of frequencies. As the Frequency of input signal varies, so does the input voltage signal applied to voltage-to-current converter. However, because the characteristic of converter remains substantially linear, the phase-locked loop may be able to operate over a wider range of input signals, and still exhibit the same dynamic behavior.

Thus, a need exists to provide a voltage-to-current converter that has a substantially linear current/voltage characteristic over substantially the entire range of a DC power supply voltage signal.

SUMMARY OF THE INVENTION

Briefly, in accordance with one embodiment of the invention, a voltage-to-current converter operated by a power supply generating a predetermined voltage signal supply ranging between a high and a low voltage level, for converting an input voltage signal to an output current signal, comprises a closed-loop voltage-to-current converter having a substantially linear voltage/current characteristic responsive to a first predetermined input voltage signal having values ranging between said low voltage level and a predetermined reference voltage level. An open-loop voltage-to-current converter is coupled to the closed-loop voltage to current converter and is responsive to a second predetermined input voltage signal having values ranging between the reference voltage level and said high voltage level. The operation of the closed-loop and open loop voltage-to-current converters in combination may provide a substantially linear voltage/current characteristic for a wide range of input voltage signals.

A voltage-to-current converter in accordance with the present invention has many benefits and advantages over conventional voltage-to-current converters. For example, it exhibits a linear current/voltage characteristic over substantially the entire range of input voltage signal. This characteristic allows for better performance in many electronic applications that employ a voltage-to-current converter. Furthermore, since the dynamic range of a voltage-to-current converter in accordance with the present invention is wider than conventional voltage-to-current converters, and provides a substantially rail-to-rail linear response, it is possible to use the converter in systems that use a smaller voltage signal supply, $V_{DD}$, than voltage signal supplies used in past systems.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may be best understood by reference to the following detailed description when read with the accompanying drawings in which:

DETAILED DESCRIPTION OF THE INVENTION

Figure 2:
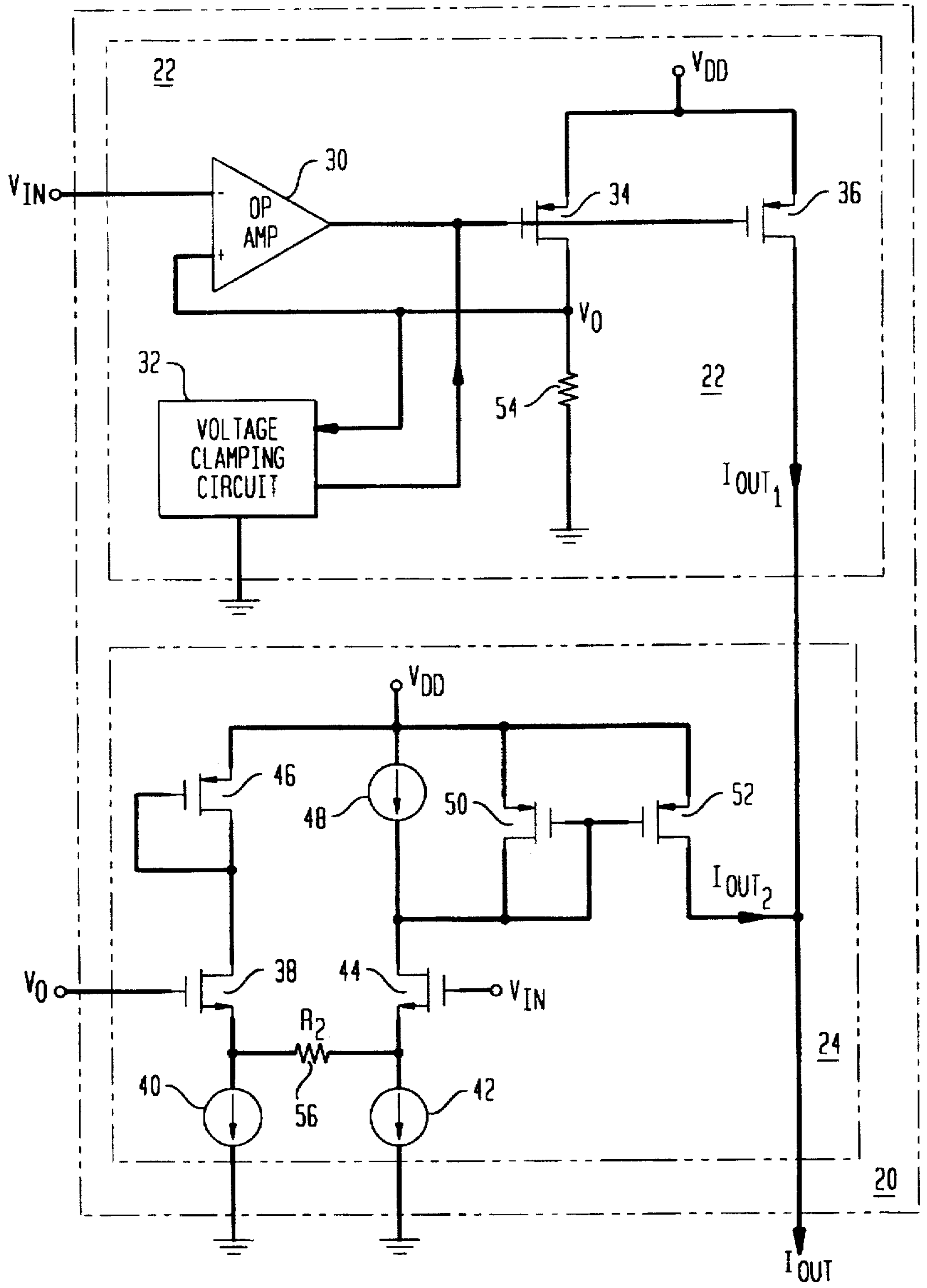
FIG. 2 illustrates a schematic diagram of a voltage-to-current converter in accordance with one embodiment of the present invention.

FIG. 2 illustrates a schematic diagram of a voltage-to-current converter, such as 20, in accordance with one embodiment of the present invention, although the invention is not limited in scope in that respect. Voltage-to-current converter 20 employs a first voltage-to-current converter 22 having an operational amplifier 30 configured to receive input voltage signals, $V_{IN}$, at its inverting terminal. The output terminal of operational amplifier 30 is coupled to a current mirror formed by p-channel MOSFET transistors 34 and 36. It is noted that the invention is not limited in this respect, and other types of transistors may be employed in the voltage-to-current converter of the present invention.

The gate terminals of transistors 34 and 36 are coupled together, and are configured to receive the voltage signal provided at the output terminal of amplifier 30. The source terminals of transistors 34 and 36 are also coupled together and to a DC power supply voltage signal, $V_{DD}$. The drain terminal of transistor 34 is coupled to a resistor 54 having a resistance $R_1$. A voltage clamping circuit 32 is coupled to the drain terminal of transistor 34 so as to clamp the voltage signal level of the drain terminal at about a predetermined reference value, such as $V_{CLAMP}$. An output terminal of voltage clamping circuit 32 is coupled to the gate terminal of transistor 34. It is noted that the invention is not limited in scope in that respect. Voltage clamping circuit 32 does not allow the value of voltage signal $V_O$ to exceed, $V_{CLAMP}$, regardless of the value of input voltage signal, $V_{IN}$. The value of $V_{CLAMP}$ is not critical, as long as it is configured to be at a level that maintains transistor 34 in its saturation region and prevents it from entering its triode region. Furthermore, voltage clamping circuit 32 is not required to clamp the voltage signal, $V_O$, at a precise reference value. As a result, the current generated at the output terminal of transistor 36 is $$I_{OUT1}=[V_{IN}/R_1]-[V_O/R_1]$$

Voltage-to-current converter 20 further employs a second voltage-to-current converter having a differential input pair formed by n-channel MOSFET transistors 38 and 44. The source terminals of transistors 38 and 44 are coupled together via a resistor 56 having a resistance $R_2$. Furthermore, the source terminals of transistors 38 and 44 are each coupled to current sources 40 and 42 respectively. The drain terminal of transistor 56 is coupled to a load transistor 46. The drain of transistor 44 is coupled to a current source 48, which in turn is coupled to power supply voltage signal, $V_{DD}$. The drain terminal of transistor 44 is also coupled to a current mirror formed by transistors 50 and 52.

The gate terminal of transistor 38 is coupled to the drain terminal of transistor 34, so as to receive the voltage signal $V_O$. The gate terminal of transistor 44 is configured to receive input voltage signal, $V_{IN}$. As a result the current generated at the output terminal of transistor 52 $I_{OUT2}$, is substantially equal to $[V_{IN}-V_O]/R_2$.

For an arrangement where the value of resistance 54 is substantially equal to resistance 56, the current generated at the output terminal of transistor 52 is $$I_{OUT2}=[V_{IN}-V_O]/R_1$$

The total output current signal is $$I_{OUT}=I_{OUT1}+I_{OUT2}$$

During operation, voltage-to-current converter 20 is powered by a DC power supply, which provides a high level voltage signal, $V_{DD}$, and a low level voltage signal, $V_{SS}$, or ground. To this end, in accordance with one embodiment of the invention, voltage-to-current converter 20 is able to respond linearly to input voltage signals, $V_{IN}$, ranging between the low level voltage signal and the high level voltage signal, $V_{DD}$, as will be explained in more detail hereinafter.

In one exemplary embodiment of the present invention, the value of reference voltage signal, $V_{CLAMP}$, is substantially equal to $V_{DD}-V_{SAT}$, where, $V_{SAT}$, is the saturation voltage value for transistor 34. To this end, for input voltage signals ranging between $V_{SS}$ or ground level and $V_{IN=VDD}-V_{SAT}$, voltage-to-current converter 22 operates and provides an output current $$I_{OUT1}=V_O/R_1=V_{IN}/R_1$$

During this time, since the value of voltage signal, $V_O$, substantially follows the value of voltage signal $V_{IN}$, voltage-to-current converter 24 does not provide a noticeable output current signal. However, once the value of input voltage signal, $V_{IN}$, approaches the value of the voltage clamp signal, $V_{CLAMP}=V_{DD}-V_{SAT}$, voltage clamping circuit 32 clamps the value of voltage signal $V_O$, preventing it to follow input voltage signal, $V_{IN}$. At the same time, voltage clamping circuit 32 controls the voltage signal at the gate of transistor 34 so as to maintain the operation of the transistor in its linear region. At this point, the value of output current signal becomes $$I_{OUT1}=[V_{DD}-V_{SAT}]/R_1$$

As the value of input voltage signal $V_{IN}$ begins to exceed the value of clamped voltage signal $V_O$, voltage-to-current converter 24 also begins to operate, so as to generate an output current signal $$I_{OUT2}=[V_{IN}-[V_{DD}-V_{SAT}]]/R_1$$

Thus, the total output current becomes $$I_{OUT}=V_{IN}/R_1$$

for all values of input voltage signal, $V_{IN}$, including values approaching DC power supply voltage signal, $V_{DD}$. It is noted that voltage/current characteristic of voltage-to-current converter 20 is substantially linear for the relatively small region that it operates, for example, for input voltage signals ranging between $V_{DD}-V_{SAT}$ up to $V_{DD}$. Thus the combined voltage/current characteristics of voltage-to-current converters 22 and 24 is linear over the entire range of input voltage signals, $V_{IN}$. This result is achieved by clamping the voltage signal at the drain terminal of transistor 34 so as to prevent transistor 34 from entering its triode region and complementing the operation of voltage-to-current converter 22 by an additional voltage-to-current converter 24, for input voltage signals larger than the predetermined reference voltage, $V_{CLAMP}$.

Figure 3:
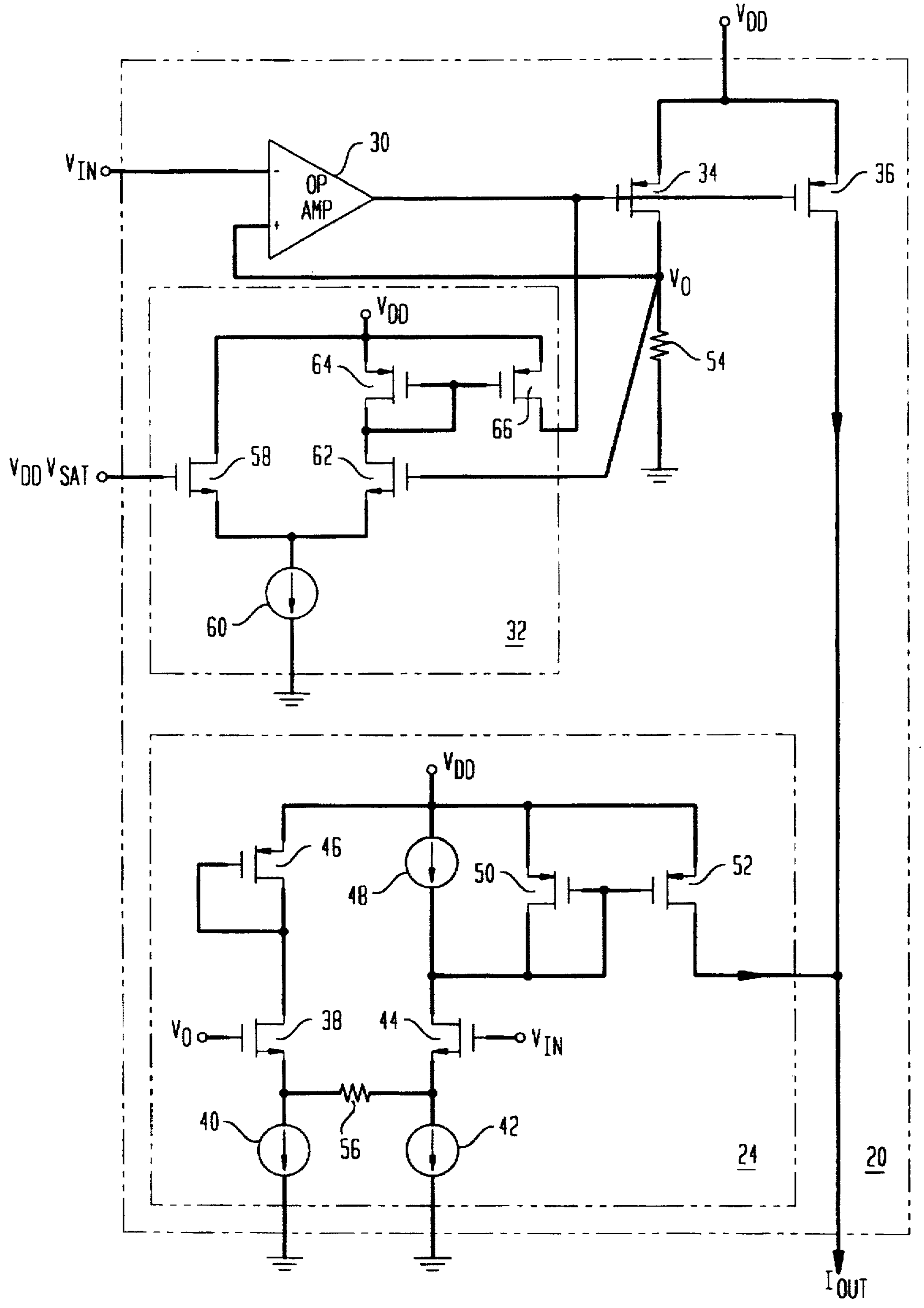
FIG. 3 illustrates a schematic diagram of a voltage-to-current converter in accordance with another embodiment of the present invention.

FIG. 3 illustrates another embodiment of voltage-to-current converter 20 in accordance with the present invention, which employs an exemplary voltage clamping circuit 32, although the invention is not limited in scope in that respect and other voltage clamping circuits may be employed without departing from the principles taught in accordance with the present invention. It will be further appreciated that in other embodiments of the invention, instead of clamping a voltage signal, the output current signal $I_{OUT1}$ may be directly clamped by other clamping circuits.

Voltage clamping circuit 32 comprises a differential input pair formed by n-channel MOSFET transistors 58 and 62 and a current mirror formed by transistors 64 and 66. The source terminals of transistors 58 and 62 are coupled together and to a current source 60. The drain terminal of transistor 62 is coupled to the drain terminal of transistor 64, which functions as an active load. The gate terminal of transistor 64 is coupled to the gate terminal of transistor 66 and also to the drain terminal of transistor 62. The source terminals of transistors 64 and 66 are coupled together and to the DC power voltage signal, $V_{DD}$. The drain terminal of transistor 66 is coupled to the output terminal of amplifier 30. The gate terminal of transistor 62 is coupled to the drain terminal of transistor 34. The gate terminal of transistor 58 is configured to receive a predetermined reference voltage signal, $V_{CLAMP}$, such as $V_{CLAMP}=V_{DD}-V_{SAT}$, as explained above in reference with FIG. 2.

During operation, as the value of input voltage signal, $V_{IN}$, increases, the voltage signal at the gate of transistor 34 decreases, leading to increased current flow through transistor 34. As a result the voltage signal $V_O$ also increases following input voltage signal, $V_{IN}$. As voltage signal, $V_{IN}$ approaches and begins to exceed $V_{CLAMP}=V_{DD}-V_{SAT}$, more current begins to flow through transistors 62, 64 and 66. This increase in current flow causes the voltage signal at the gate of transistor 34 to increase, and as a result prevents the increase of current flow through transistor 34. In effect, clamping circuit 32 as illustrated in FIG. 3 provides a feedback mechanism so as to limit the value of the voltage signal $V_O$ to a predetermined level.

As explained before, in reference with FIG. 2, once voltage signal $V_O$ is clamped to voltage signal, $V_{CLAMP}$, such as $V_{DD}-V_{SAT}$, voltage-to-current converter 24 begins to operate to provide a current signal $I_{OUT2}$ in response to input voltage signals, $V_{IN}$, ranging between, $V_{DD}-V_{SAT}$, and $V_{DD}$.

Figure 1:
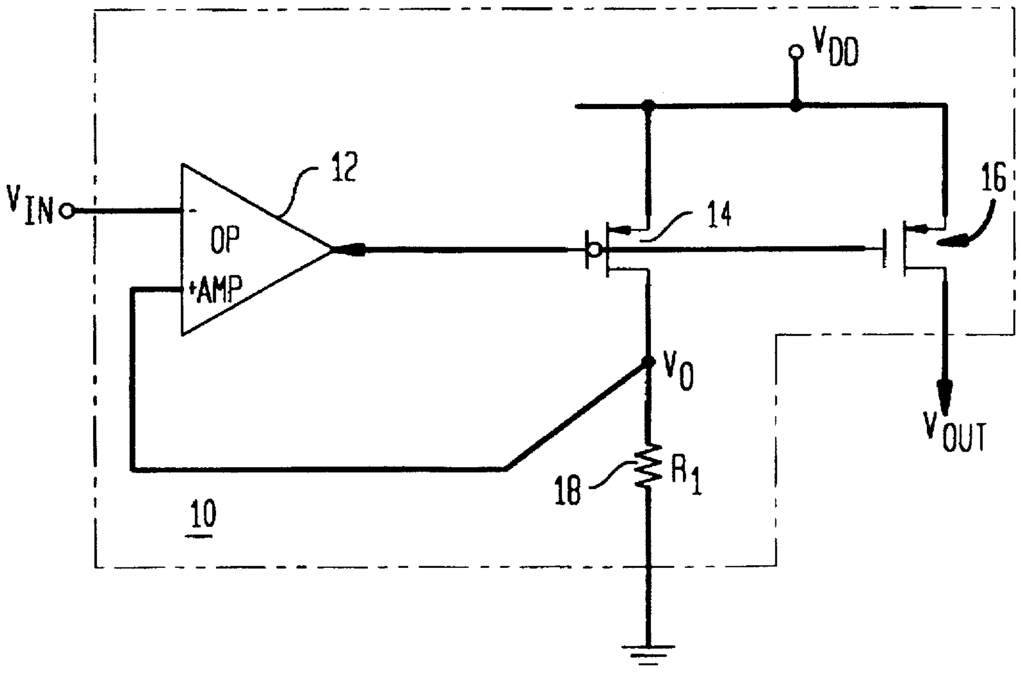
FIG. 1 (PRIOR ART)
FIG. 1 illustrates a schematic diagram of an exemplary prior art voltage-to-current converter.
Figure 4:
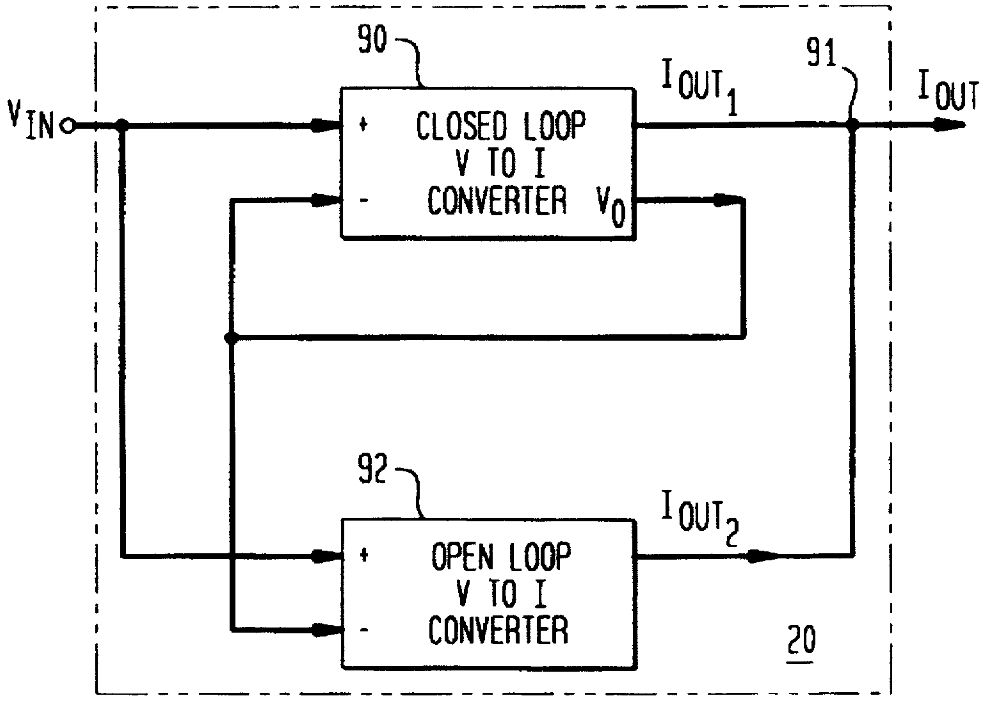
FIG. 4 illustrates a block diagram of a voltage-to-current converter in accordance with one embodiment of the present invention.

FIG. 4 illustrates a block diagram of voltage-to-current converter 20 in accordance with one embodiment of the present invention. Voltage-to-current converter 20, preferably, comprises a closed-loop voltage to current converter 90, which is configured to receive input voltage signal, $V_{IN}$, and provide an output current signal $I_{OUT1}$. Voltage-to-current converter 90 includes a second input terminal, which is configured to receive a feedback output voltage signal $V_O$, generated at its output terminal. It operates substantially linearly, until the feedback output voltage signal, $V_O$, reaches a predetermined reference voltage signal, such as, $V_{CLAMP}$. At this point, voltage-to-current converter 90 clamps the value of the current signal $I_{OUT1}$ so that it does not increase in response to increases in the value of input voltage signal, $V_{IN}$, which may lead to non-linear responses. This feedback arrangement allows the voltage-to-current converter 90 to not enter a non-linear characteristic region in response to input voltage signals, $V_{IN}$, above a predetermined value. Thus the voltage/current characteristic of the voltage-to-current converter 90 remains substantially linear.

Voltage-to-current converter 20 further comprises an open loop voltage-to-current converter 92, which is configured to receive the input voltage signals, $V_{IN}$, at one of its input terminals, and the feedback voltage signal, $V_O$, at another one of its input terminals. Voltage-to-current converter 92 generates an output current signal, $I_{OUT2}$, in response to voltage signals, $V_{IN}$, and $V_O$, preferably for input voltage signals ranging between the predetermined reference voltage signal, such as $V_{CLAMP}$, and $V_{DD}$. Open loop voltage-to-current converter 92 functions as a secondary circuit, complementing the operation of closed-loop voltage-to-current converter, which preferably provides the substantial portion of voltage to current conversion. An adder 94 is configured to receive and combine the output current signals, $I_{OUT1}$, and $I_{OUT2}$, to provide the total output current, $I_{OUT}$.

The open loop voltage-to-current converter improves the input voltage range to which voltage-to-current converter 20 is responsive. Furthermore, open loop voltage-to-current converter 92 improves the high frequency characteristics of voltage-to-current converter 20.

It will be appreciated that the present invention is not limited in scope to MOSFET transistors, and other types of semiconductor devices may be advantageously employed in accordance with the principles of the invention.

It is noted that in accordance with another embodiment of the present invention, voltage-to-current converter 20 is designed with complimentary input differential pairs, so as to respond to differential pair signals. Furthermore, it will be appreciated that the voltage-to-current converter of the present invention may be implemented in an integrated circuit for many electronic applications.

It will be further appreciated that an embodiment of a voltage-to-current converter in accordance with the present invention may be used, for example, in a phase-locked loop, which typically comprises a phase detector, a charge pump, a loop filter, and a controlled oscillator. The output of the charge-pump when coupled to the loop-filter results in a voltage which indirectly controls the oscillator frequency. This voltage is then provided to the voltage-to-current converter of the present invention to generate a responsive current that controls the oscillator. The linear transfer characteristics of the voltage-to-current converter of the present invention allows the oscillator to substantially maintain constant loop dynamics.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

I claim:

1. In an integrated circuit, a voltage-to-current converter configured to operate by a power supply generating a predetermined voltage signal supply ranging between a high and a low voltage level, for converting an input voltage signal, $V_{IN}$, to an output current signal, said voltage-to-current converter comprising:

- a closed-loop voltage-to-current converter configured to receive said input voltage signal, $V_{IN}$ and to provide a first output current signal substantially linearly responsive to a predetermined range of said input voltage signal having values between said low voltage level and a predetermined reference voltage level;
- an open-loop voltage-to-current converter configured to receive said input voltage signal, said open-loop voltage-to-current converter coupled to said closed-loop voltage-to-current converter, so as to provide a second output current signal, substantially linearly responsive to a predetermined range of said input voltage signal having values ranging between said reference voltage level and said high voltage level; and
- an adder for combining said first and second output current signals.

2. The invention in accordance with claim 1, wherein said voltage-to-current converter is a rail-to-rail converter.

3. The invention in accordance with claim 2, wherein said closed-loop voltage-to-current converter further comprises a voltage clamping circuit so as to clamp the output voltage signal generated by said closed-loop voltage-to-current converter to a level substantially equal to said predetermined reference voltage signal.

4. The invention in accordance with claim 1, wherein said closed-loop voltage-to-current converter further comprises:

an operational amplifier configured to receive said input voltage signal, $V_{IN}$; and a current mirror configured to receive a voltage output signal from said operational amplifier, and generate said output current in response to said received voltage output signal.

5. The invention in accordance with claim 4 further comprising a voltage clamping circuit coupled to said current mirror, such that said closed-loop voltage-to-current converter operates substantially in its liner region.

6. The invention in accordance with claim 5, wherein said current mirror comprises:

a first transistor configured to receive said output voltage signal generated by said operational amplifier, said transistor having an output voltage terminal coupled to said voltage clamping circuit, so that the value of the voltage signal generated at said output voltage terminal is clamped at a predetermined value.

7. The invention in accordance with claim 6, wherein said current mirror further comprises a second transistor coupled to said first transistor so as to generate said first output current signal.

8. The invention in accordance with claim 5, wherein said open loop voltage-to-current converter further comprises:

a differential input circuit configured to receive said input voltage signals, $V_{IN}$, and said reference voltage signal; and a current mirror coupled to said differential input circuit configured to provide said second current signal when said input voltage signal is larger than said reference voltage signal.

9. The invention in accordance with claim 8, wherein said differential input circuit comprises a pair of transistors coupled together in a differential arrangement.

10. The invention in accordance with claim 9, wherein said current mirror coupled to said differential input circuit further comprises a pair of transistors configured to provide said second output current signal.

11. A rail-to-rail voltage-to-current converter configured to operate by a power supply generating a predetermined voltage signal supply ranging between a high and a low voltage level, for converting an input voltage signal to an output current signal, said voltage-to-current converter comprising:

a closed-loop voltage-to-current converter means configured to receive said input voltage signal so as to convert said input voltage signal to a first output current signal;

a clamping means for sensing a feedback signal generated by said first voltage-to-current converter means, said clamping means limiting the value of said first output current signal in response to said generated feedback signal such that said first voltage-to-current converter operates substantially in its linear characteristics region; and a second voltage-to-current converter means configured to receive said input voltage signal, said second voltage-to-current converter coupled to said first voltage-to-current converter means for generating a second output current signal in response to said input voltage signal.

12. A rail-to-rail voltage-to-current converter in accordance with claim 11, wherein said second voltage-to-current converter means generates said second output current signal when said input voltage signal is larger than a predetermined reference voltage signal.

13. A rail-to-rail voltage-to-current converter in accordance with claim 11 wherein said clamping means is a voltage clamping circuit configured to receive said feedback signal in the form of an output voltage signal generated by said closed-loop voltage-to-current converter and compare said feedback signal with a predetermined reference voltage value.

14. A rail-to-rail voltage-to-current converter in accordance with claim 13 wherein said voltage clamping circuit comprises:

a differential input means for receiving said output voltage signal generated by said closed-loop voltage-to-current converter, and a reference voltage signal substantially equal to said predetermined reference voltage signal; and a current mirror coupled to said differential input means of said voltage clamping circuit.

15. The rail-to-rail voltage-to-current converter in accordance with claim 14, wherein said first voltage-to-current converter further comprises an operational amplifier configured to receive said input voltage signal, wherein said current mirror is configured to receive the output voltage signal generated at the output terminal of said operational amplifier.

16. The rail-to-rail voltage-to-current converter in accordance with claim 15, wherein the output terminal of said voltage clamping circuit is coupled to the output terminal of said operational amplifier.

17. The rail-to-rail voltage-to-current converter in accordance with claim 12, wherein said second voltage-to-current converter means further comprises a differential input means for receiving said input voltage signal and said feedback signal generated by said first voltage-to-current converter.

* * * * *